United States Patent [19]
Navoczynski

[11] Patent Number: 4,474,517
[45] Date of Patent: Oct. 2, 1984

[54] FASTENING DEVICE

[75] Inventor: Stanley J. Navoczynski, Allentown, Pa.

[73] Assignee: The Budd Company, Troy, Mich.

[21] Appl. No.: 385,698

[22] Filed: Jun. 7, 1982

[51] Int. Cl.³ .......................................... F16B 13/06
[52] U.S. Cl. ........................................ 411/45; 411/57
[58] Field of Search ............... 411/43, 44, 57, 60, 411/69, 70, 45

[56] References Cited

U.S. PATENT DOCUMENTS

| | | | |
|---|---|---|---|
| 2,385,886 | 10/1945 | Shaff | 411/43 |
| 2,756,624 | 7/1956 | Austin | 411/43 |
| 2,877,682 | 3/1959 | Barry | 411/57 |
| 2,898,798 | 8/1959 | Carno | 411/57 |
| 3,030,849 | 4/1962 | Bisbing | 411/57 |
| 3,047,181 | 7/1962 | Heidenwolf | 411/70 |
| 3,147,525 | 9/1964 | Texier | 411/44 X |
| 3,204,517 | 9/1965 | Looker | 411/57 |
| 3,438,302 | 4/1969 | Sandor | 411/57 |

FOREIGN PATENT DOCUMENTS

| | | | |
|---|---|---|---|
| 1237423 | 6/1960 | France | 411/43 |
| 925034 | 5/1963 | United Kingdom | 411/60 |

*Primary Examiner*—Thomas J. Holko
*Assistant Examiner*—Rodney M. Lindsey
*Attorney, Agent, or Firm*—Edward M. Farrell; Herman Foster; Thomas I. Davenport

[57] ABSTRACT

A blind rivet is disposed to be inserted through openings in a pair of structures. The rivet includes a main stem having a pliable sleeve disposed therearound. The rivet includes a head portion on one end and an enlarged portion or bulb on the other. The rivet is held in place as the head portion is drawn outwardly causing the bulb portion to expand the sleeve so as to provide clinching of the two structures. After the expansion of the sleeve, the stem is driven back into the openings in the structure.

5 Claims, 7 Drawing Figures

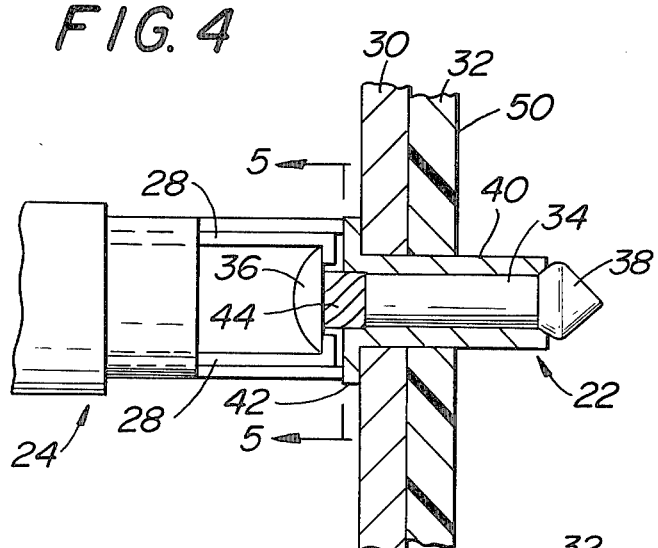
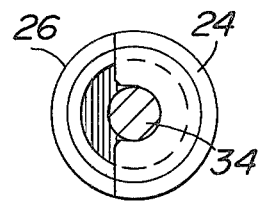
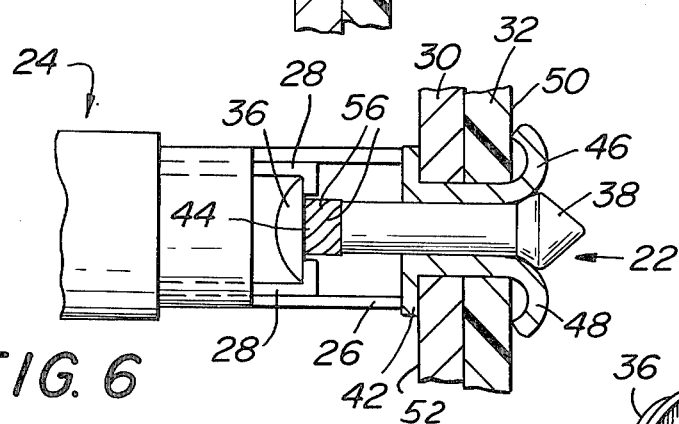
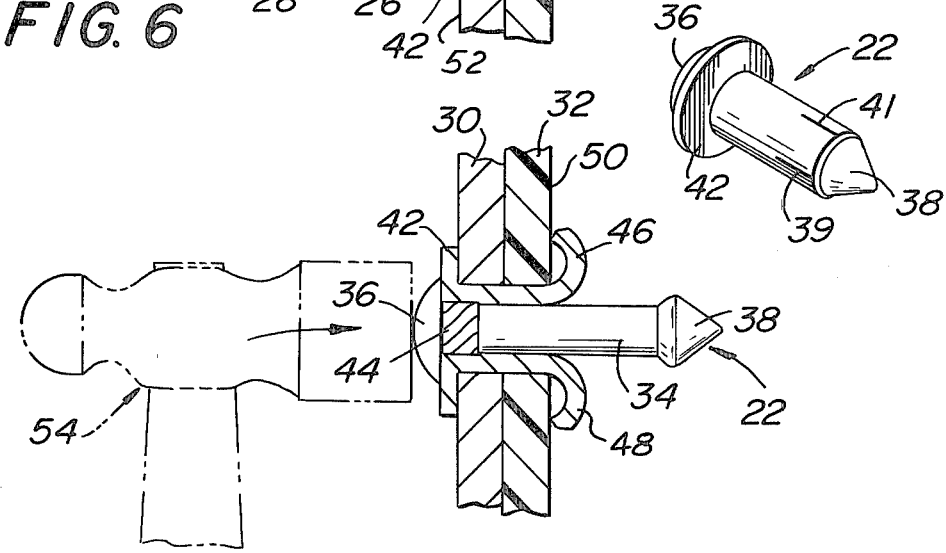

FASTENING DEVICE

BACKGROUND OF THE INVENTION

So-called "molly" bolts have been used in the past. These molly bolts are expandable bolts having a split sheath-like sleeve threaded at one end. When the bolt is inserted snugly into masonary, for example, the turning of the bolt draws the ends of the sheet together thus spreading the sides of the sheath to maintain the bolt firmly in place.

Various other types of bolts have used features similar to the molly bolt. In such a bolt, the bolt is inserted through one or two aligned openings with a threaded stem being used to expand the prongs which hold the bolt in place.

In the manufacture of refrigerated trailers, for example, it is often necessary to utilize hundreds of rivets to secure two structures to each other such as for example a corner molding to join adjacent panels.

When such a larger number of rivets are involved, it is impractical to utilize threaded rivets to cause expansion of sheaths within openings because the time involved in such operations would be excessive and would greatly add to the overall cost of the trailers involved.

Also used heretofore have been rivets in refrigerated trailers for insertion into openings between two structures. Instead of using threaded portions, stems have been surrounded by pliable sleeves or sheaths. The stems are pulled out of the sleeves through a head portion of the rivet by a suitable tool while the rivet is held in place. When the rivet is pulled out, the pliable sleeve expands to lock the two structures in place. After the structures have been locked in place, the stems are generally broken off. When the stems are broken off from the rivet, small openings remain in the center of the heads of the rivet. These openings provide a problem in refrigerated trailers and it is this problem that the present invention is specifically directed to overcome.

When openings are left in the heads of the rivet as a result of the removal of the stem, bacteria and other germs tend to accumulate in the openings. Because of the side of the openings, it is extremely difficult to clean out these openings. In a case of refrigerated trailers involving food, it is essential that the interior of the trailer be free of germs and bacteria as must as is reasonably possible.

OBJECTS OF THE INVENTION

It is an object of this invention to provide an improved blind rivet.

It is a further object of this invention to provide an improved blind rivet which provides a smooth external surface which may be readily cleaned and does not include any openings or holes therein in which dirt or germs would tend to accumulate.

BRIEF SUMMARY OF THE INVENTION

In accordance with the present invention, a rivet is provided for securing together two relatively thin structures. The structures include spaced openings therein dimensioned slightly larger than the rivet to receive the rivet therethrough when the openings in the structures are aligned with respect to each other. The rivet includes an integral mandrel stem, a head portion at one end and an enlarged portion at the opposite end. A pliable sleeve surrounds the stem and is retained therein between the head and enlarged portions. The sleeve includes an outwardly extending flange spaced from the head portion and larger than the openings in the structures. The rivet is inserted into a rivet tool which grips the rivet between the head portion and the flange. The rivet is then inserted into aligned openings in the two structures. The sleeve is held in the aligned openings as the head portion is gripped by the rivet tool to partly retract the stem. During retraction of the stem, the enlarged portion or bulb expands the sleeve until the two structures are clinched by the rivet. The stem is retained within the expanded sleeve. The stem is then driven back through the expanded sleeve until the head portion comes in contact with the flange. The head portion is flat or curved to provide a smooth surface for easy cleaning. A knurled section slightly larger than the stem diameter is employed in the stem between the head portion and the pliable sleeve. When the stem is driven back through the sleeve, this knurled portion is driven into the sleeve to secure the rivet in place.

Other objects and advantages of the present invention will be apparent and suggest themselves to those skilled in the art, from a reading of the following specification and claims, in connection with the accompanying drawings.

DESCRIPTION OF THE DRAWINGS

FIG. 3 is an isometric view of a rivet in accordance with the present invention;

FIG. 4 is a cross-sectional view illustrating a rivet positioned within openings of a pair of structures along with a rivet installation tool;

FIG. 5 is a cross-sectional view taken along lines 5—5 of the rivet tool head with the rivet in position;

FIG. 6 is a cross-sectonal view somewhat similar to FIG. 4 illustrating the step of partly retracting the rivet; and FIG. 7 is a view somewhat similar to FIGS. 4 and 6 illustrating the final step in the operation of inserting the rivet, in accordance with the present invention.

DETAILED DESCRIPTION OF THE INVENTION

Figure 1:
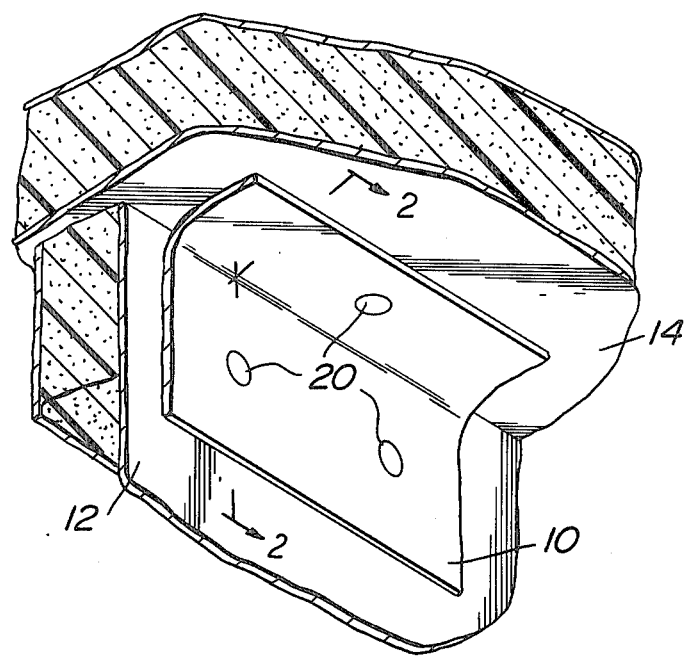
FIG. 1 is a broken-away view illustrating one application of the rivet in accordance with the present invention.
Figure 2:
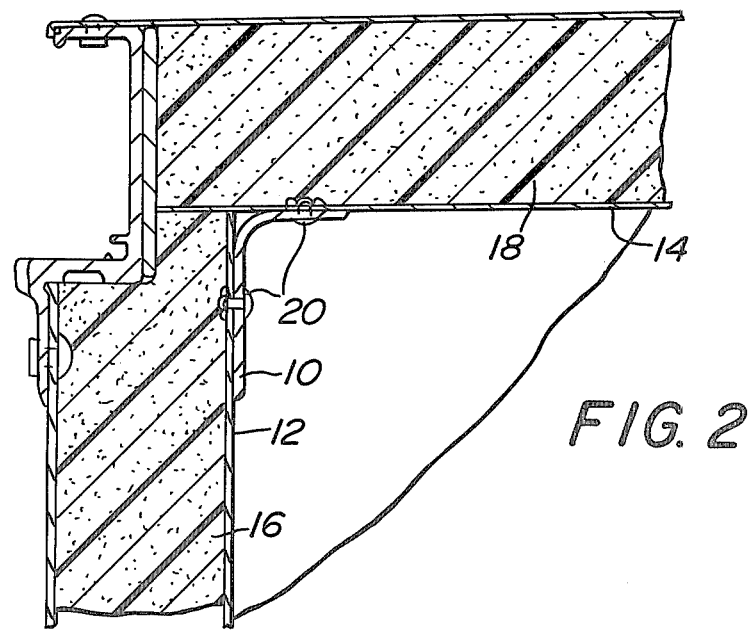
FIG. 2 is a cross-sectional view taken along lines 2—2 of FIG. 1.

Referring to FIGS. 1 and 2, a strip 10 which may be a corner molding, is disposed to be connected to a pair of panels 12 and 14. The panels 12 and 14 may be walls within a refrigerated trailer which includes blocks of foam material 16 and 18. The corner molding 10 is connected to the panels 12 and 14 by means of a plurality of rivets 20. The type of rivets used is the type used in the present invention and which will be described in connection with the subsequent figures. Generally, however, the strip 10 is put in place in the manner illustrated. A plurality of aligned openings in the molding or strip 10 are adapted to be aligned with the spaced openings in the panels 12 and 14. The rivets 20 are then suitably inserted by a riveting tool. As previously mentioned, various means have been used for fastening corner panels and other structures together in refrigerated trailers.

Referring to FIG. 4, a rivet 22 is positioned in a rivet gun 24 in the manner illustrated. FIG. 5 illustrates the front view of a rivet gun head. The rivet gun head includes an outer half ring 26 and an inner half ring 28. Basically, the rivet gun 24 is conventional and is designed to insert the rivet 22 into a pair of aligned openings in structures 30 and 32. The structure 30 may be the corner molding previously illustrated in FIGS. 1 and 2 and the structure 32 may be one of the illustrated panels. Of course, other types of structures may be involved. After the rivet 22 is in place, a series of operations to complete the installation follows which will be described. Before describing the operations, however, the rivet 22 will be described in detail.

The rivet 22 comprises an integral stem or mandrel 34 having a head portion 36 at one end and an enlarged bulb portion 38 at the opposite end. A sleeve 40 which comprises pliable material is disposed around the main body of the stem 34 between the head 36 and the enlarged portion 38. The pliable sleeve includes a plurality of slits, such as 39 and 41, to facilitate the initial expansion of the sleeve. The sleeve portion 40 includes a flange 42. A knurled portion 44 is disposed in close proximity to the head portion 36.

After the rivet gun has been inserted into the rivet head, the rivet 22 is inserted within the openings of the structure 30 and 32 in the manner illustrated in FIG. 4. The rivet gun 24 is in place ready for the next subsequent operation.

Referring to FIG. 6, operation of the rivet gun 24 causes the inner ring 28 to retract the stem or mandrel 34. The outer half ring 26, in the meantime, is firmly disposed against the flange 42 to maintain the sleeve 40 in place as the stem 34 is withdrawn. When the inner ring 28 is retracted, the stem 34 starts to move through the sleeve 40. The enlarged portion or bulb 38 bears against the pliable sleeve 40 causing the slits 39 and 41 of the sleeve to separate to expand in effect breaking into petal-shaped or prong-like elements 46 and 48. Continued outward movement of the stem 34 finally causes the ends of the petals 46 and 48 to physically engage the inner surface 50 of the structure 32. At this point, the structures 30 and 32 are secured together and the movement of the stem 34 is at its extreme outward position.

The rivet gun 24 is then removed from the rivet, leaving the head 36, the knurled portion 44 and a portion of the main stem 34 exposed outside the surface 52 of the structure 30.

Referring to FIG. 7, the final step of the operation is illustrated. A hammer 54 or other suitable tool is employed to strike the head 36 causing the stem 40 to be driven back through the expanded sleeve 34 in the manner illustrated in FIG. 7.

The reinsertion of the stem 34 provides a smooth external surface along the survace 52. Because the head 36 does not include any smaller openings or holes, it is relatively easy to clean. The knurled portion 44 is driven into the sleeve 40 causing it to expand slightly to thereby maintain the rivet 22 securely in place.

The knurled section 44 digs into the expanded sleeve since it is slightly oversized and expands the sleeve to fill the hole. Spiral ribs, such as ribs 56, in the knurled portion prevents the rivet from coming back out.

The rivet 22 in effect combines the best features of a structurally blind rivet while providing the appearance of a buck rivet. Additional weather proofing may be provided by installation of a gasket under the flange 42. Due to the fact that the mandrel or stem 34 is relatively solid, good shear strength is provided.

What is claimed is:

1. A rivet for securing together two relatively thin structures having spaced openings therein dimensioned to receive said rivet therethrough, with the openings in said structures being alignable with each other, comprising:
   (a) an integral mandrel stem;
   (b) said stem including a head portion at one end, an enlarged bulb portion at the opposite end, and a knurled section adjacent said head portion;
   (c) a pliable sleeve surrounding said stem and retained thereon between said head portion and said enlarged portion;
   (d) said knurled section being larger in diameter than the main body of said stem and the inner wall portion of said sleeve,
   (e) said sleeve including an outwardly extending flange larger than the openings in said structures spaced from said head portion to receive a rivet tool therebetween;
   (f) the spacing between said flange and said head portion being dimensioned to permit said rivet tool to engage said flange to hold said sleeve as said rivet tool grips said head portion and retracts said stem to cause said bulb portion to expand said sleeve;
   (g) said stem being loosely disposed within the expanded sleeve after said two structures are clinched by said rivet; and
   (h) said head portion being disposed to receive a force thereon to drive said stem through said expanded sleeve to cause said head portion to engage said flange and said knurled section to expand said sleeve.

2. A rivet as set forth in claim 1 wherein said pliable sleeve includes a plurality of slits therein to assist in the expansion of said sleeve when said stem is partly retracted to cause said bulb portion to expand said sleeve.

3. A rivet as set forth in claim 2 wherein said slits are disposed towards the end of said sleeve to cause petal-like elements to be formed when said sleeve is expanded, with the ends of said petal-like elements engaging the inner surface of said structures to clinch said surfaces and prevent further retraction of said stem.

4. A rivet as set forth in claim 3 wherein spiral ribs are included in said knurled portion to prevent said stem from coming back out of said expanded sleeve after it has been driven therethrough.

5. A rivet as set forth in claim 4 wherein said head portion includes a smooth exterior surface to facilitate cleaning thereof.

* * * * *